(12) United States Patent
Sassatelli et al.

(10) Patent No.: US 8,944,291 B2
(45) Date of Patent: Feb. 3, 2015

(54) DOSING UNIT FOR CIP/SIP

(75) Inventors: Luca Sassatelli, Ozzano Emilia (IT); Claudio Trebbi, Medicina (IT)

(73) Assignee: IMA Life, S.r.l. (IT)

( * ) Notice: Subject to any disclaimer, the term of this patent is extended or adjusted under 35 U.S.C. 154(b) by 395 days.

(21) Appl. No.: 13/319,264

(22) PCT Filed: May 4, 2010

(86) PCT No.: PCT/IB2010/051947
§ 371 (c)(1), (2), (4) Date: Mar. 20, 2012

(87) PCT Pub. No.: WO2010/128453
PCT Pub. Date: Nov. 11, 2010

(65) Prior Publication Data
US 2012/0168465 A1    Jul. 5, 2012

(30) Foreign Application Priority Data
May 8, 2009   (IT) .............................. BO2009A0284

(51) Int. Cl.
| B67D 1/08 | (2006.01) |
| B65D 88/54 | (2006.01) |
| B67D 7/58 | (2010.01) |
| B65B 43/42 | (2006.01) |
| G01F 11/02 | (2006.01) |

(52) U.S. Cl.
CPC ................................... G01F 11/021 (2013.01)
USPC ............ 222/148; 222/251; 222/380; 141/144

(58) Field of Classification Search
USPC .............. 222/380, 168.5, 170, 167, 168, 251, 222/148, 149, 150, 151; 141/144–152
See application file for complete search history.

(56) References Cited

U.S. PATENT DOCUMENTS

| 1,490,923 | A | * | 4/1924 | Hansen | 222/168.5 |
| 2,187,615 | A | * | 1/1940 | Ayars | 222/168.5 |
| 2,340,336 | A | * | 2/1944 | Martin | 141/98 |
| 2,345,617 | A | * | 4/1944 | Martin | 222/168.5 |
| 2,351,059 | A | * | 6/1944 | Martin | 222/168.5 |
| 2,466,731 | A | * | 4/1949 | Nordquist | 141/94 |
| 2,770,397 | A | * | 11/1956 | Galloway | 222/168.5 |
| 3,175,738 | A | * | 3/1965 | Wyers et al. | 222/309 |
| 4,244,404 | A | * | 1/1981 | Brockner et al. | 141/146 |
| 4,326,568 | A | * | 4/1982 | Burton et al. | 141/114 |
| 4,437,498 | A | * | 3/1984 | Pankratz et al. | 141/89 |
| 4,565,304 | A | * | 1/1986 | Dronet | 222/108 |

(Continued)

FOREIGN PATENT DOCUMENTS

| FR | 2797046 A1 | 2/2002 |
| GB | 2020737 A | 11/1979 |

(Continued)

*Primary Examiner* — Kevin P Shaver
*Assistant Examiner* — Stephanie E Williams
(74) *Attorney, Agent, or Firm* — Laubscher & Laubscher, P.C.

(57) ABSTRACT

A dosing unit includes a piston movable along a first axis in a cavity of a casing, provided with an inlet and with an outlet for a product to be dosed, and in a further cavity of the casing, connected to and substantially coaxial with the cavity and provided with a further outlet for cleaning and/or sterilizing fluids. The casing includes an internal tubular element in which the cavity is made and a covering element that externally envelops the internal tubular element and extends from an end of the internal tubular element in such a way as to form the further cavity.

16 Claims, 8 Drawing Sheets

(56) References Cited

U.S. PATENT DOCUMENTS

| | | | | |
|---|---|---|---|---|
| 4,842,026 | A | * | 6/1989 | Nordmeyer et al. ............... 141/1 |
| 4,860,926 | A | * | 8/1989 | Juenkersfeld et al. ........ 222/148 |
| 5,467,899 | A | * | 11/1995 | Miller ........................... 222/309 |
| 6,237,650 | B1 | * | 5/2001 | Ansaloni ....................... 141/237 |
| 6,378,737 | B1 | * | 4/2002 | Cavallaro et al. ............. 222/309 |
| 7,156,262 | B2 | * | 1/2007 | Navarro ........................ 222/256 |
| 8,256,474 | B2 | * | 9/2012 | Stienen ........................ 141/144 |
| 8,381,777 | B2 | * | 2/2013 | Lupi et al. ...................... 141/48 |

FOREIGN PATENT DOCUMENTS

| | | |
|---|---|---|
| JP | 02-242782 A | 9/1990 |
| JP | 2000-512548 A | 9/2000 |
| WO | 9749974 A1 | 12/1997 |
| WO | 2004/027352 A2 | 4/2004 |

* cited by examiner

Fig. 1

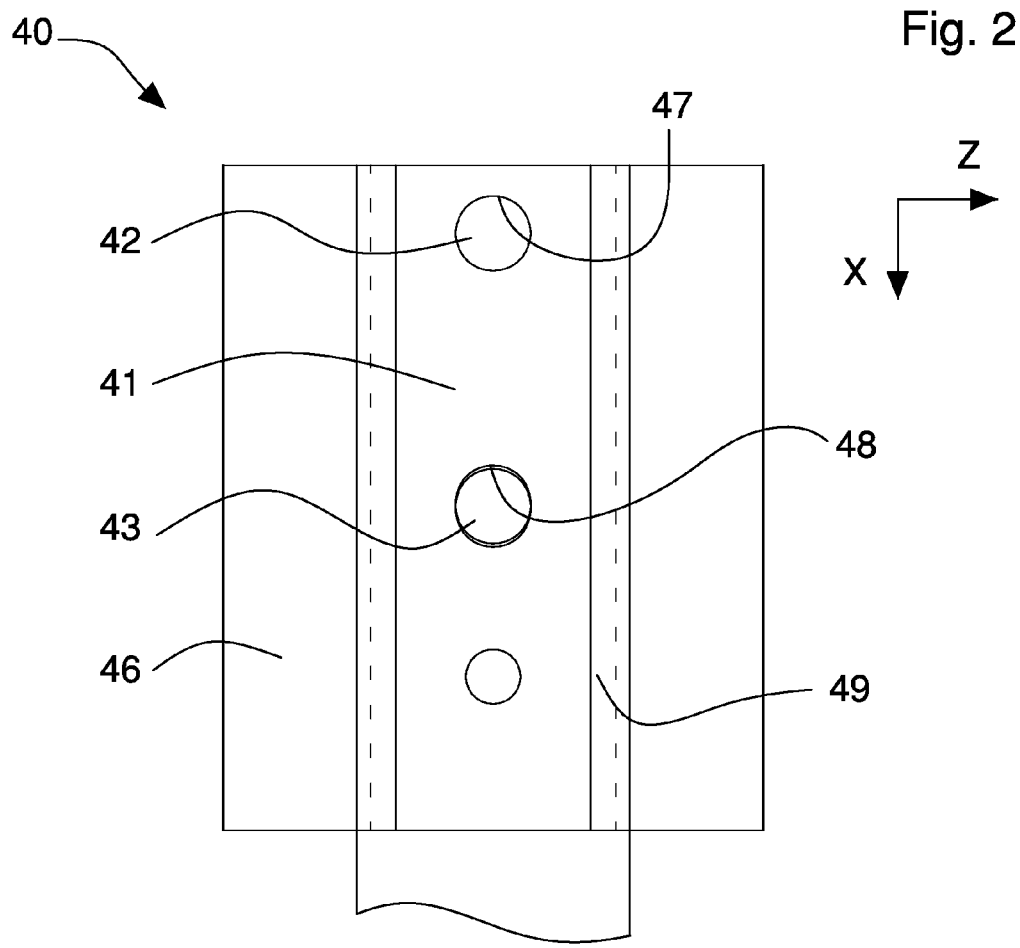
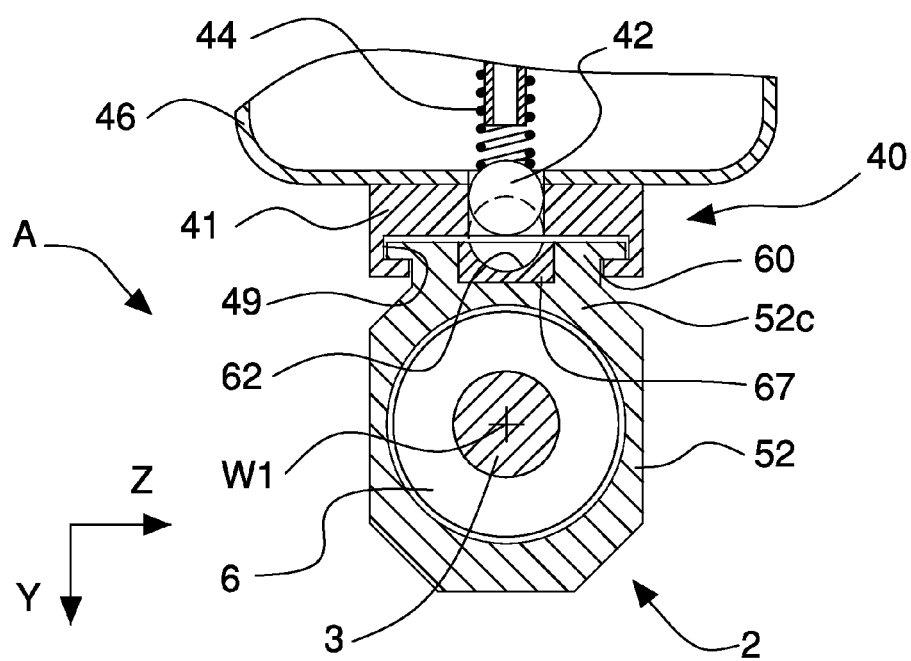

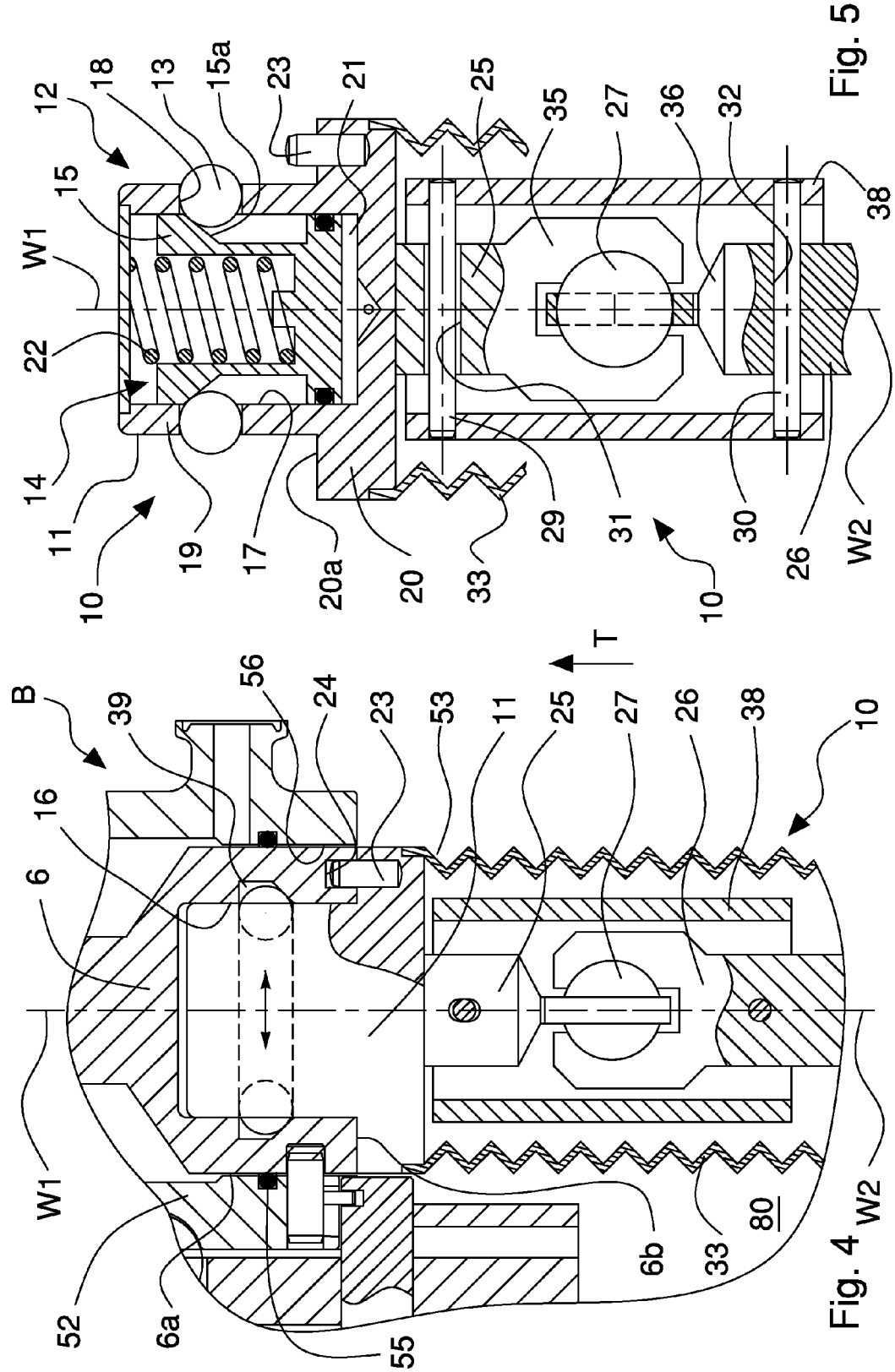

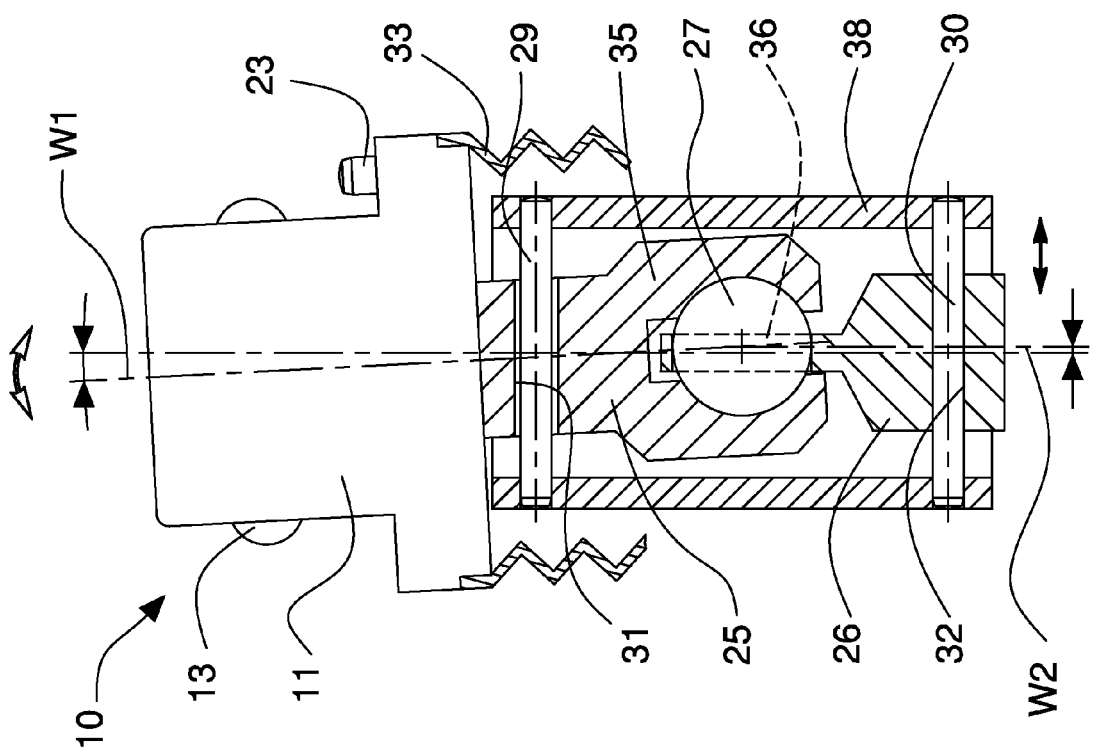
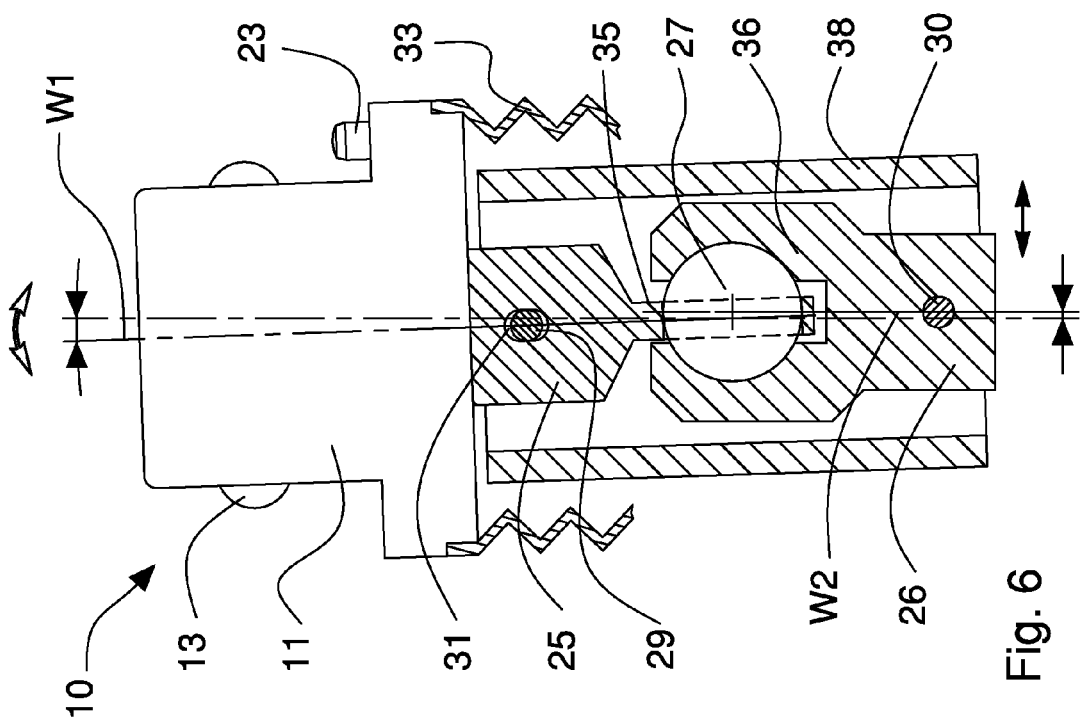

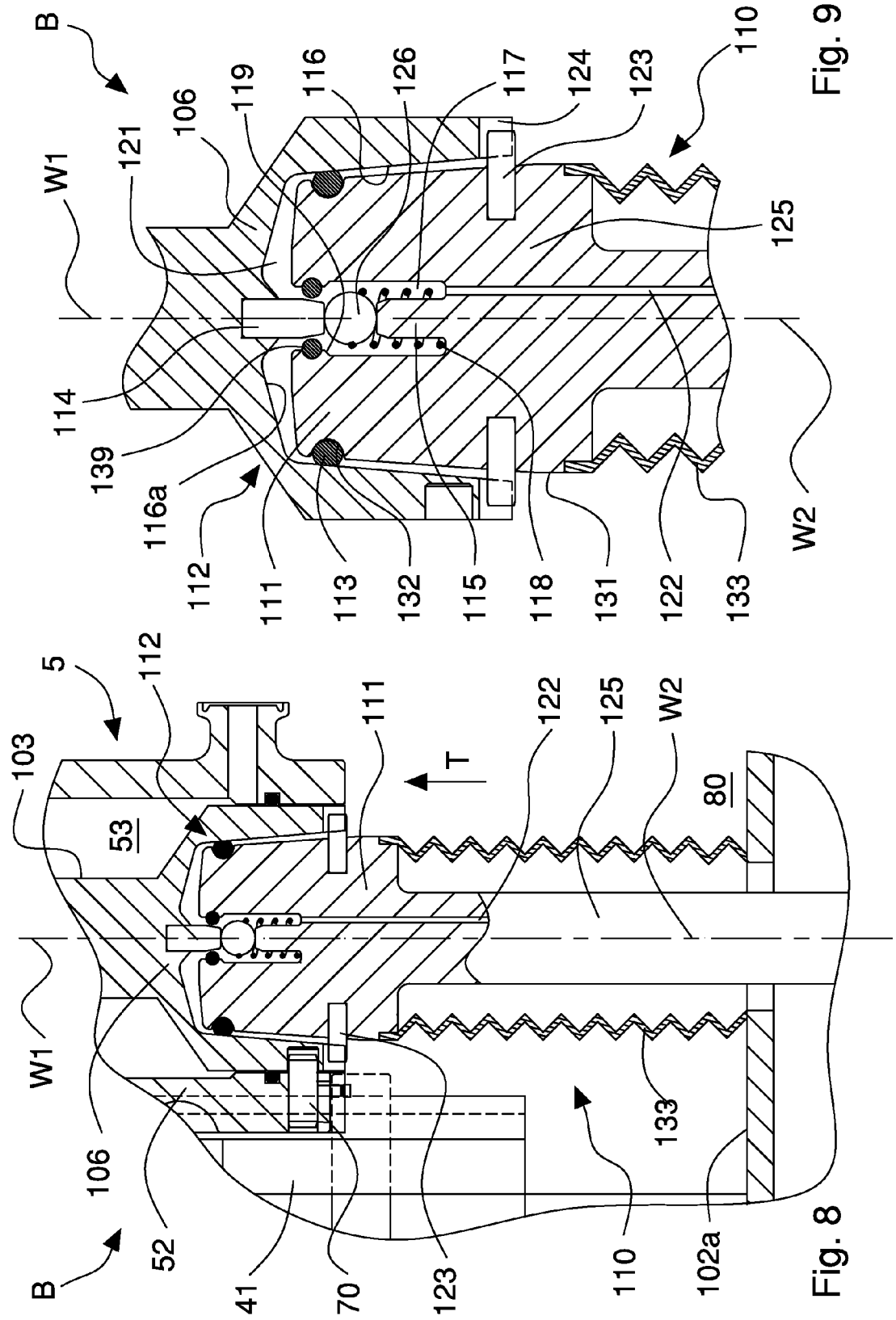

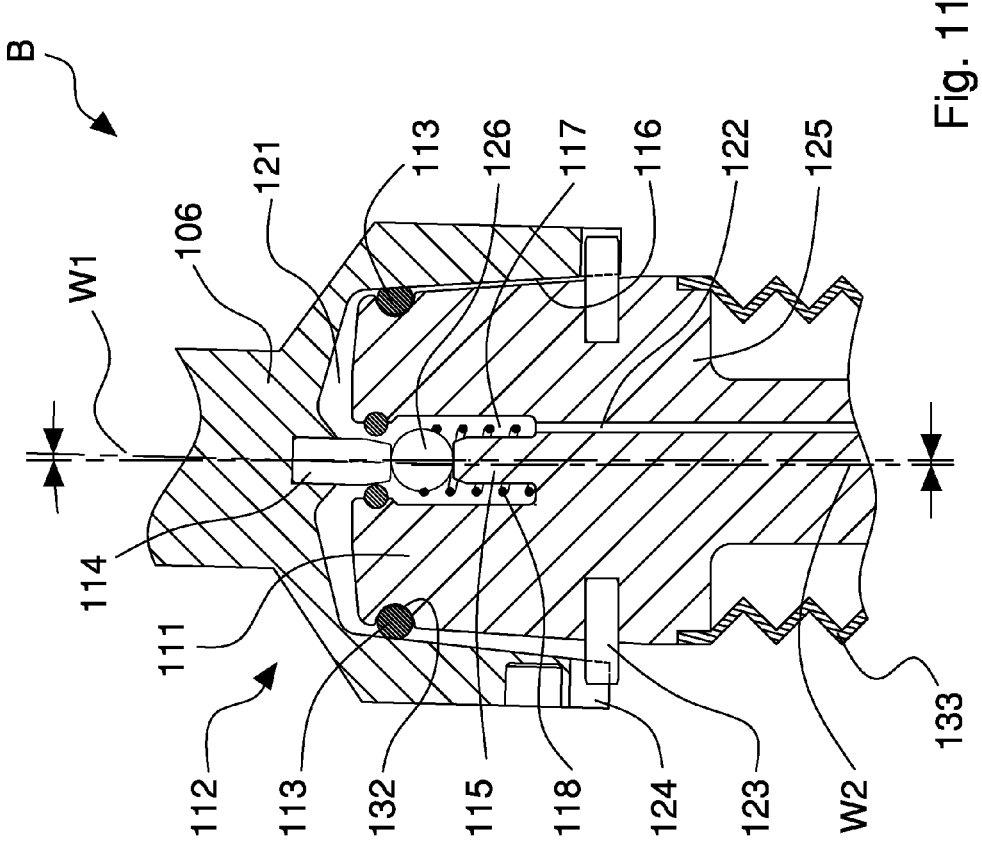
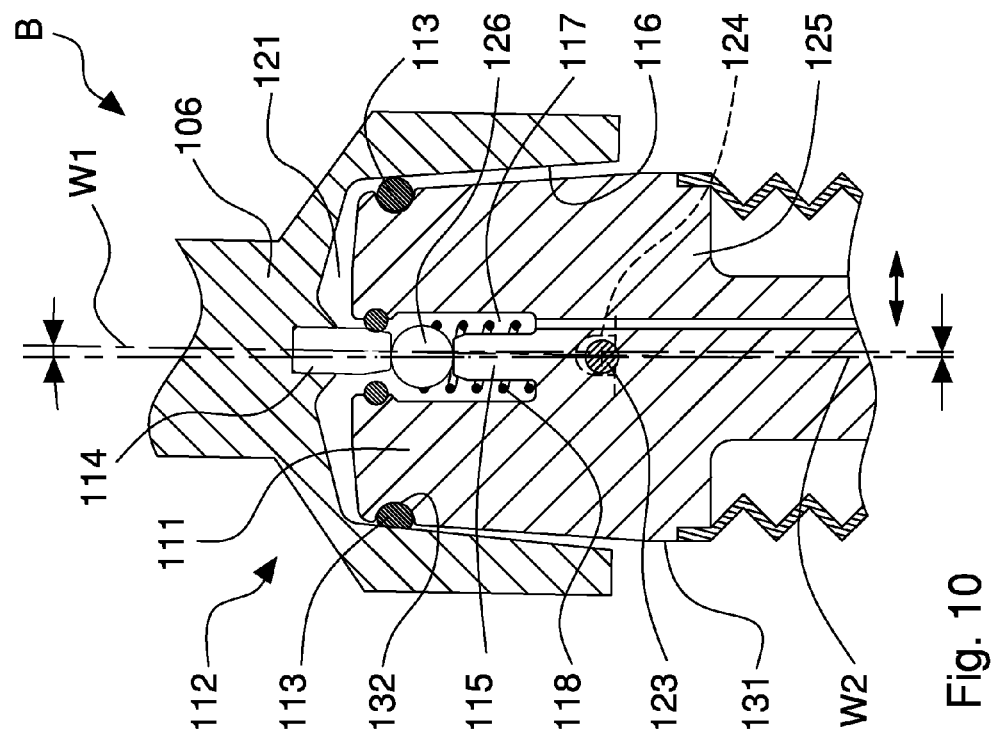
Fig. 11
Fig. 10

DOSING UNIT FOR CIP/SIP

This application is a §371 national phase entry of PCT International Application No. PCT/IB2010/051947 filed May 4, 2010. PCT/IB2010/051947 claims priority to IT Application No. BO2009A000284 filed May 8, 2009. The entire contents of these applications are incorporated herein by reference.

BACKGROUND OF THE INVENTION

The present invention relates to a dosing apparatus, in particular a volumetric dosing apparatus of the piston-cylinder type which is associated with automatic filling machines for dosing determined and precise quantities of liquid.

BRIEF DESCRIPTION OF THE PRIOR ART

In the pharmaceutical, cosmetic and food fields the use of volumetric piston pumps that are installed on filling machines for dosing or metering fluid products with variable viscosity in containers, such as bottles, vials, ampoules, and the like is known.

In such devices, which are also called dosing pumps or syringes, a piston moves linearly with a reciprocating motion inside a dosing chamber made in a hollow, tubular cylinder. The piston stroke enables a defined volume of liquid product to be drawn and subsequently dispensed, the volume being a function of the stroke and of the diameter of the dosing chamber. The product to be dosed enters and exits the dosing chamber respectively through an inlet and outlet opening. The inlet opening is connected to a supply conduit connected to a tank of the product, whereas the outlet opening is connected to a delivery conduit connected, for example, to nozzles or cannulas for dosing the product in the containers.

External on-off valves are provided on the supply and delivery conduits to alternately close and/or open the latter during syringe operation.

Some dosing syringes that replace external valves include a switching device that is placed inside the dosing chamber and is controlled so as to connect the dosing chamber alternatively to the supply and delivery conduits in phase with the rectilinear movement of the piston. This switching may include a rotating valve inserted inside the dosing chamber that is able to open and close the inlet and outlet openings.

Alternatively, dosing syringes are known in which the switching device is formed on the piston and referred to as a valve-piston. In this case, the piston, in addition to sliding axially, can rotate about its longitudinal axis by a preset angle, in order to place the dosing chamber alternately in communication with the supply conduit and with the delivery conduit.

In dosing syringes, especially in the pharmaceutical field, the precision of the piston stroke is essential for the precision and accuracy of the dosage. Similarly, precision in rotating the valve-piston is necessary to ensure correct suction and delivery of the product to be dosed.

In a dosing syringe provided with a separate rotating piston and valve, the cylinder is open at both ends to enable the piston and the valve to be connected to distinct driving members that provide alternating linear movement and rotation, respectively.

In dosing syringes provided with a valve piston, a top or bottom end portion of the valve piston is connected to driving members that both rotate and move the piston linearly.

Known filling machines include supporting frames that support a plurality of dosing syringes and, if provided, support the respective driving members of the pistons and/or valves.

The supporting frames include shaped seats inside which the dosing syringes are insertable and removably lockable, typically by fixing brackets that are fastened to the frame by screws or by quick-fit connections of the tri-clamp type.

Known supporting frames ensure precise and firm support of the dosing devices but impose laborious and complex assembly and dismantling procedures that may also require the use of two operators. Such procedures are even more complex and inconvenient if the dosing syringes are associated with filling machines operating in an aseptic or sterile environment and thus filling machines are provided with housings that enable the processing zone to be accessed in which packaging of the product occurs only through openings provided with gloves ("gloveports").

When the driving members are arranged above the syringes they are housed inside suitable housings as they include motors, transmission and kinematic mechanisms, sensors, etc. that for reasons of cleanliness and hygiene have to be separated from the processing zone.

The dimensions and the position of the aforementioned housings nevertheless have some drawbacks, which include a reduction in the accessibility to the process zone and to the operating devices located within the process zone, should the need arise to access the interior of the process zone (compromising the sterility thereof) in the event of failure or breakage of the aforementioned mechanical members and components to permit maintenance tasks to be performed. In addition, if the sterile and/or aseptic process zone is subject to a flow of sterile air, the dimensions and position of the aforementioned housings allow the airflow to be deviated or altered at the dosing zone increasing the risk that movement of dosing syringe pistons may generate particles that may be dragged by the airflow inside the housings below, contaminating the housings.

In order to overcome these drawbacks, particularly in the packaging of pharmaceutical products, the current trend is to have dosing syringes that are rotated and moved rectilinearly from below so as to have corresponding movement members located inside a base of the filling machine.

For this purpose, a drive shaft exits the base of the filling machine and is removably connected to a lower end of the piston of the syringe by a joint of prismatic type that provides the necessary precision in the transmission of linear motion and rotation and at the same time enables the syringe to be assembled and dismantled.

In particular the joint typically includes a T-shaped element, fixed to the end of the piston and housed in a seat with a complementary shape that is obtained on an upper end of the drive shaft. The T-shaped element can slide transversely inside the seat, typically perpendicularly, to the movement direction of the piston. In this manner, the T-shaped element can be inserted and detached from the seat, respectively, to connect or disconnect the syringe to or from the movement members. Nevertheless, in order to enable the T-shaped element to be removed from the seat in any operating position of the piston, the stem of the latter has to be of a length that is such as to enable the lower end of the stem to always remain outside the cylinder.

Due to the considerable length of the pistons, such dosing syringes are bulky and difficult to handle, assemble, and dismantle. Also, the dimensions and the space requirements of the supporting frames that are necessary for supporting the dosing devices are significant and considerably limit y accessibility to the processing zone of the filling machine.

Known dosing syringes are generally made of stainless steel, a material that is suitable for contact with pharmaceutical and/or food products and which can undergo cleaning and sterilising procedures.

Further, it is known to use ceramic materials to which it is possible to make components that have narrow dimensional tolerances and reduced surface roughness values.

Ceramic materials have very high coefficients of resistance to wear and to high temperatures and extremely moderate thermal expansion coefficients. These features make ceramic materials particularly suitable for making high-precision piston pumps that are set up for cleaning and sterilizing in place tasks.

Ceramic materials nevertheless have limits in the mechanical field, inasmuch as they are relatively fragile, easily subject to breakage, fractures and splintering.

For this reason the cylinders of pumps made of ceramic material are covered by a metallic liner, typically made of stainless steel. The liner is hot-mounted through interference in such a manner as to form a single monolith body with the ceramic cylinder.

The external metallic casing, in addition to protecting the ceramic internal cylinder, enables the syringe to be fixed to the supporting frame and the fittings of the supply and delivery conduits to be connected thereto.

In many applications, especially in the pharmaceutical field and in the foodstuffs field, it is required that the dosing syringes be subject to cleaning and sterilizing operations in place, without any component thereof needing to be dismantled. Such operations, which are known by the name of CIP/SIP (Cleaning In Place/Sterilizing In Place), include a sequence of steps that are performed automatically or semi-automatically, during which the interior of the dosing syringes is traversed by cleaning liquids at different temperatures and by pressurized steam. In this manner, within a relatively short amount of time it is possible to clean and sterilize all the parts of the syringe that came into contact with the product.

An essential condition for the correct and valid performance of a cleaning and sterilizing operation is that each internal surface of the syringe that has been in contact with the product is appropriately subjected to the necessary flowing speed by the cleaning and sterilizing fluids.

In addition, the structure of the syringe has to ensure correct draining and emptying of these fluids at the end of the cleaning and sterilizing cycles, i.e. there are no zones in which said fluids can accumulate and stagnate. In particular, the dosing syringes set up for CIP/SIP operations include a cleaning and sterilizing chamber connected to and coaxial with the dosing chamber, and provided with an opening for the exit of the cleaning and sterilizing fluids. In one syringe cleaning and sterilizing configuration, the piston is positioned inside the cylinder, such that the portions thereof that come into contact with the product are spaced from the internal walls of the dosing chamber and of the cleaning and sterilizing chamber. In this manner, the aforesaid portions of the syringe and the internal walls of the entire dosing chamber can be reached by the cleaning and sterilizing fluids.

FR 2797046 illustrates a volumetric dosing device including a hollow body defining a dosing chamber, provided with a supply conduit and with a delivery conduit of the product to be dosed, and a piston that is movable linearly and in rotation inside the dosing chamber. The dosing chamber extends below a secondary chamber, arranged for housing an extension of the piston and closed on the bottom by a closing element, removably connected to the hollow body and provided with a conduit for discharging the cleaning and sterilizing fluids. The device further includes a cleaning and sterilizing chamber placed above the dosing chamber and provided with an inlet conduit for the cleaning and sterilizing fluids. The cleaning chamber includes a cylindrical tubular element removably connected to the hollow body and provided with a gap connected to the inlet conduit and separated from the cleaning and sterilizing chamber by a cylindrical baffle provided with transverse holes.

One drawback of such a dosing device is the complex, bulky and costly structure thereof, this structure including among other things, four distinct conduits for the entry and exit, respectively, of the product to be dosed and of the cleaning and sterilizing fluids.

WO 2004027352 discloses a volumetric dosing device including a hollow body defining a dosing chamber, provided laterally with a supply conduit of the product to be dosed, and a piston that is movable linearly and in rotation inside the dosing chamber. The dosing chamber is closed by a closing element, removably connected to the first hollow body and provided with a delivery conduit of the product to be dosed. A further hollow body, connected to a lower end of the hollow body, forms a cleaning and sterilizing chamber provided at the bottom of a discharge conduit of the cleaning and sterilizing fluids.

The aforementioned dosing syringe has a more compact and simpler structure than the syringe illustrated in FR 2797046, but is more demanding and laborious to handle as the piston may accidentally exit from the hollow bodies, during transport, thus becoming damaged and/or soiled.

Both the dosing devices discussed above including a plurality of components (hollow bodies, closing elements) that are removably connected to one another, and can nevertheless have cleaning and sterilizing problems. In fact, it is possible that, due to imprecision in the machining of the components and/or non-optimum coupling between components, in the interface or connecting zones of the components there are slits or interstices of dimensions that permit infiltration and diffusion of the product to be dosed and/or of the cleaning and sterilizing fluids. In this case, in order to perform correct and complete cleaning of the syringe, it is necessary to completely dismantle the syringe, thus increasing operating time and consequently increasing running costs.

Another drawback of the dosing devices disclosed above lies in the complex and delicate manual procedures that are necessary for correctly assembling the syringes and subsequently mounting the syringes on the filling machine. Such procedures require specialized and costly personnel.

SUMMARY OF THE INVENTION

One object of the present invention is to improve known volumetric dosing devices, in particular dosing devices of the valve-piston type that are associated with filling machines.

Another object is to make a dosing device including a dosing unit which is automatically connected to or disconnected from a piston driving device provided in the filling machine without requiring the manual intervention of an operator, thereby permitting the aforementioned piston to move into the operating position independently.

A further object is to make a dosing device including a joint that is able to connect or disconnect the piston rapidly and automatically to and from the corresponding movement mechanism and the joint at the same time ensuring precise and accurate transmission of the linear motion and rotation motion to the aforementioned piston.

Still another object is to make a dosing device including a supporting and locking device, associated with the filling machine that enables the dosing unit to be assembled and dismantled easily and quickly, while ensuring precise and firm positioning of the dosing unit in a mounting operating configuration.

A still further object is to obtain a dosing unit that is able to dose with great precision and accuracy quantities of liquid in desired volumes and is further set up for cleaning and sterilizing in place (CIP/SIP) operations.

Another further object is to make a dosing unit that has a particularly simple and compact structure and is at the same time tough and resistant to blows.

Still another object is to make a dosing unit that requires minimal and simple manual procedures for assembling and/or mounting the dosing unit on a supporting and locking device.

The dosing unit of the invention enables desired volumes of quantities of liquid to be dosed precisely and accurately and enables cleaning and sterilizing in place (CIP/SIP) operations to be performed automatically or semiautomatically. Because the housing includes an internal tubular element, in which the cavity is made that includes the lower and upper dosing chambers, and a covering element that externally envelops the internal tubular element and forms the further cavity acting as a cleaning and sterilizing chamber, it is possible to obtain a dosing unit having a structure that is simple and compact while at the same time tough and resistant to blows. The covering element is in fact made of synthetic plastics and is fixed to, and particularly molded around, the internal tubular element so as to form a single body.

The tubular element is made of ceramic material to ensure high dosing precision, as well as being particularly suitable for CIP/SIP operations.

Owing to the structure and the embodiment of the dosing unit of the invention, in the interface or coupling zones, between the covering element and the internal tubular element the presence of slits, interstices or the like, into which product to be dosed, or cleaning and sterilizing fluids may become deposited, making the CIP/SIP operations ineffective or at least unacceptable, is excluded.

The covering element further includes a handle-shaped gripping portion to enable the dosing unit to be gripped and handled easily by an operator, particularly during the mounting/dismantling step to and from a supporting device.

The dosing unit also includes a stop arranged for selectively preventing or permitting the piston to slide inside the housing along the first axis. In particular, the stop is arranged for locking the piston to the housing in a preset linear and angular position, in order to maintain the dosing unit in an assembled condition which is necessary during transporting and mounting/dismantling the dosing unit. It is thus possible to connect and lock the dosing unit in an easy and rapid manner to the respective supporting device. This mounting/dismantling procedure can be performed by just one operator who can support only the dosing unit without worrying about also supporting the piston, as usually occurs in known dosing units.

BRIEF DESCRIPTION OF THE FIGURES

The invention can be better understood and implemented with reference to the accompanying drawings that illustrate an embodiment thereof by way of non-limiting example, in which:

FIG. 1 is a partially sectioned frontal view of the dosing apparatus of the invention in a mounted configuration;

FIG. 2 is a partial side view of the supporting device of the apparatus in FIG. 1;

FIG. 3 is a section along line III-III in FIG. 1;

FIG. 4 is an enlarged detail of FIG. 1, showing a joint in an aligned operating configuration;

FIG. 5 is a partially sectioned and enlarged view of the joint in the aligned operating configuration;

FIG. 6 is a partially sectioned frontal view of the joint in a misaligned operating configuration;

FIG. 7 is a partially sectioned side view of the joint in the misaligned operating configuration;

FIG. 8 is a partially sectioned frontal view of a version of the apparatus in FIG. 1;

FIG. 9 is an enlarged detail of FIG. 8, showing the joint in an aligned operating configuration;

FIG. 10 is a partially sectioned side view of the joint in FIG. 9, in a misaligned operating configuration;

FIG. 11 is a frontal view like that in FIG. 9, showing the joint in the misaligned operating configuration;

DETAILED DESCRIPTION

Figure 1:
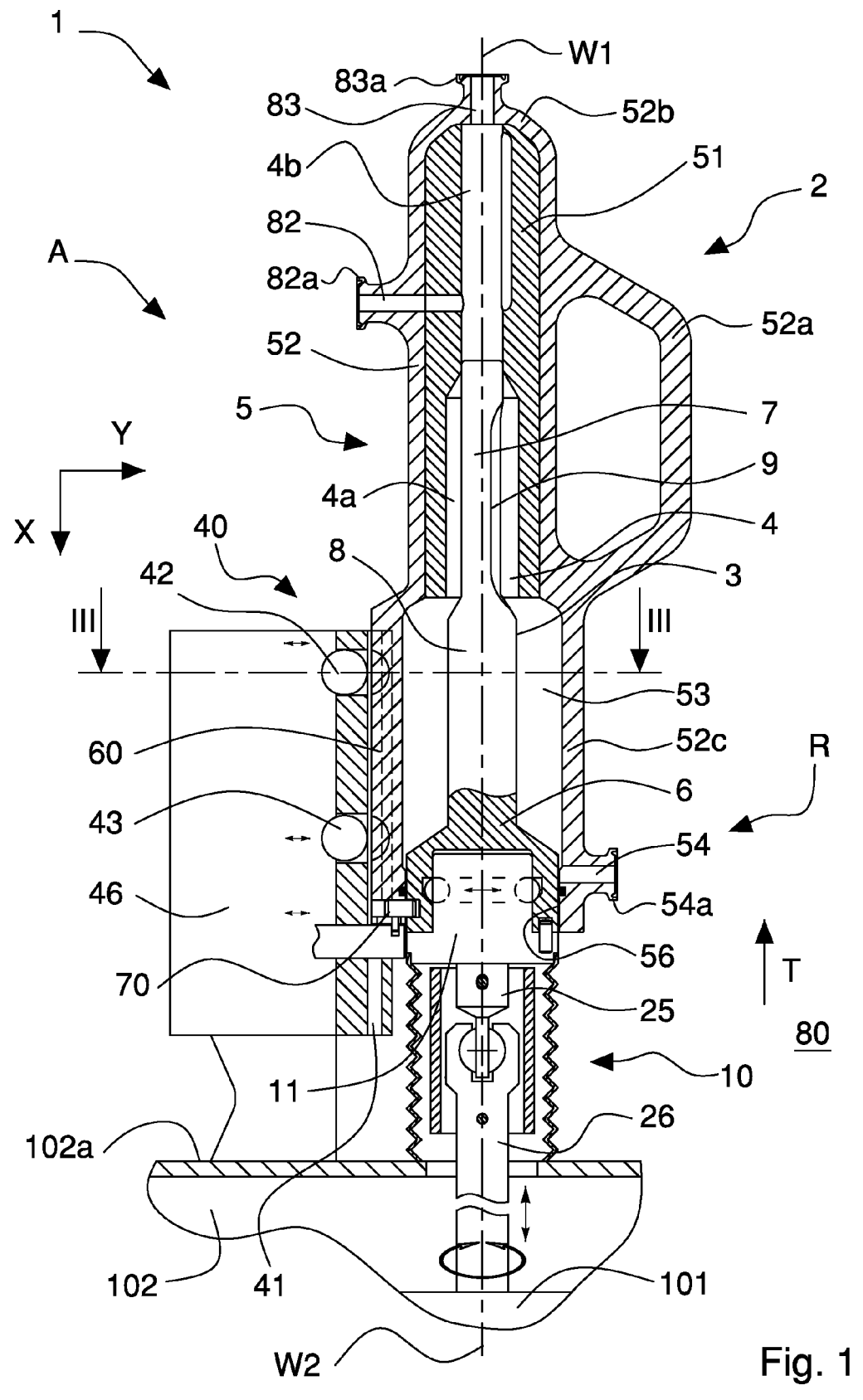
Figure 12:
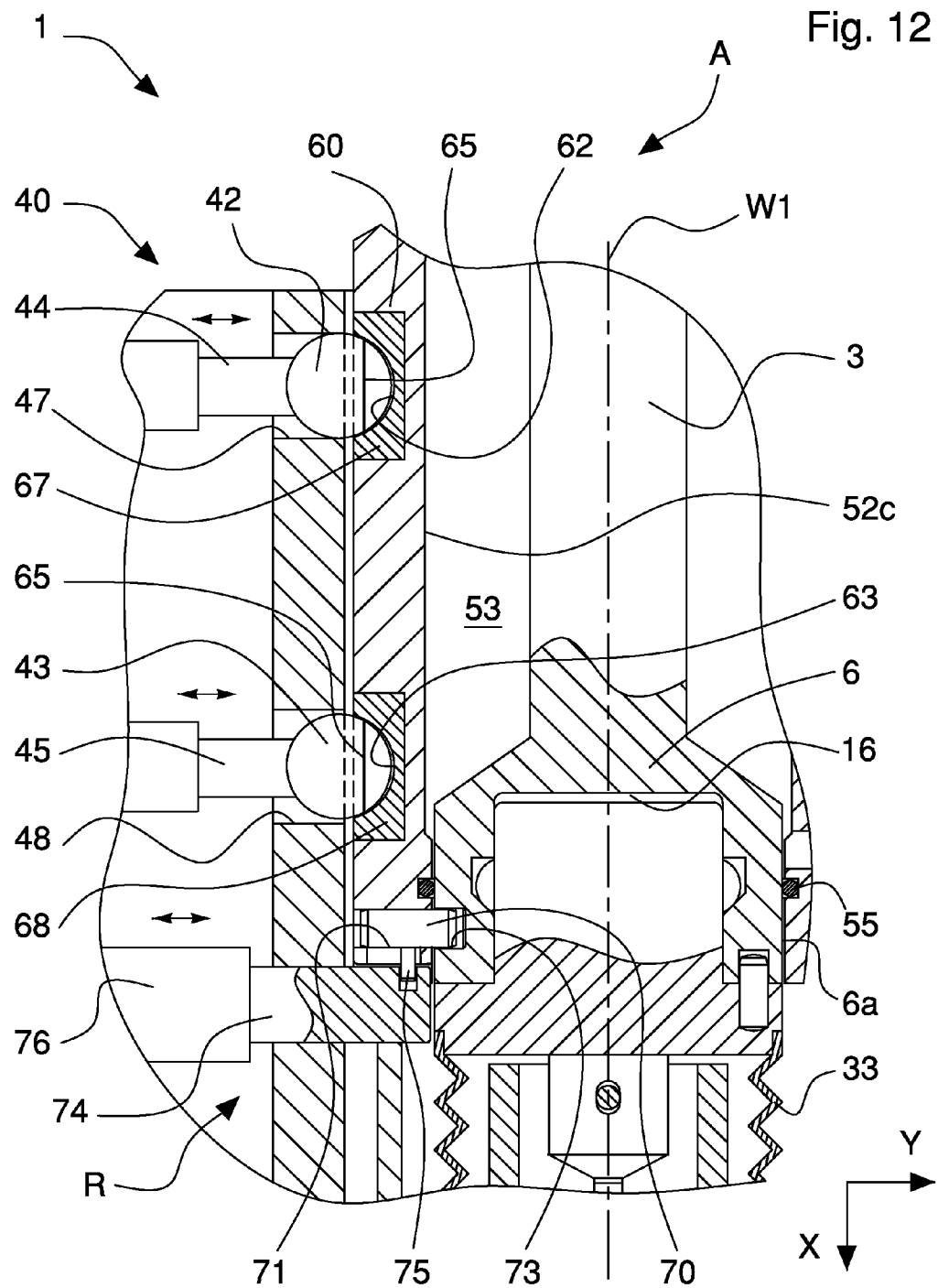
FIG. 12 is a partial and enlarged view of the apparatus in FIG. 1, showing a supporting device and a fixing device in a mounted configuration.

With reference to FIGS. 1 to 7, there is illustrated a dosing apparatus 1 that is associated with a filling machine and including a dosing unit 2 that includes a piston 3, is movable along a first longitudinal axis W1 in a cavity 4 of a housing or casing 5 for drawing a desired quantity of liquid from an inlet 82 of the casing 5 and direct the quantity of liquid to an outlet 83 of the casing 5.

The apparatus 1 includes a supporting device 40 that is, for example, secured to an external wall 102a of a base 102 of the filling machine and arranged for supporting and locking the dosing unit 2 in a mounting configuration A.

The apparatus 1 also includes a joint 10 for removably connecting, in the mounting configuration A of the dosing unit 2, a first end portion 6 of the piston 3 to a movement mechanism 101 arranged for moving the piston 3 linearly and rotationally.

The movement mechanism 101, which is of known type and is not illustrated in detail in the figures, is contained inside the base 102 of the filling machine.

With reference to the embodiment illustrated in the figures, the first end portion 6 of the piston 3 is the lower end portion, the dosing unit 2 thus being driven from below by the movement mechanism 101.

The piston 3 is of the valve-piston type and includes a second end portion 7 that is opposite the first end portion 6, is slidable inside the cavity 4 and provided with a switching device 9 that connects the cavity 4 to the inlet 82 or to the outlet 83.

The piston 3 driven by the movement or drive mechanism 101 is movable by reciprocal linear movement along the first axis W1 between a retracted or internal position and an extended or external position, and is movable around the first axis W1 with a rotating movement that is also reciprocal, between a suction position in which a switching device such as a recess 9 connects the cavity 4 to the inlet 82 and a delivery position, in which the switching device 9 connects the cavity 4 to the outlet 83.

The casing 5 of the dosing unit 2 includes an internal tubular element such as inner tubular member 51, with a substantially cylindrical shape which contains the cavity 4, and an outer cover or covering element 52 that envelops the internal tubular element 51 and extends to an end, for example a lower end, of the internal tubular element 51 in such a manner as to form a further cavity 53 provided with a respective opening 56 for the passage of the joint 10.

The internal tubular element 51 is made, for example, of ceramic material, whereas the covering element 52 is made of synthetic plastics. In particular, the covering element 52 is molded directly around the internal tubular element 51 by injection molding in such a manner as to form a single body with the latter.

The covering element 52 further includes a handle-shaped gripping portion 52*a*, to enable the dosing unit 2 to be easily gripped and handled by an operator, particularly during a mounting/dismantling step as explained in detail below.

The cavity 4, which has a substantially cylindrical shape and extends longitudinally for the entire length of the internal tubular element 51, includes a lower dosing chamber 4*a* and an upper dosing chamber 4*b* that have different diameters and lengths. In particular, the lower dosing chamber 4*a* has a greater diameter than that of the upper dosing chamber 4*b*.

The upper dosing chamber 4*b* is flowingly connected via the inlet 82 to a circuit supplying the product to be dosed, the inlet 82 including a conduit made on side walls of the tubular element 51 and of the covering element 52 and being transverse, in particular almost orthogonal to the first axis W1. The upper dosing chamber 4*b* is further flowingly connected to a delivery circuit of the product via the outlet 83, including a respective conduit for example made on a top portion 52*b* of the covering element 52, which closes the cavity 4 above, the respective conduit being substantially coaxial with the first longitudinal axis W1.

The inlet 82 and the outlet 83 are provided externally with connections 82*a*, 83*a* for quick-fit connection to the supply and delivery circuits, for example Tri-clamp quick-fit connections. The connections 82*a*, 83*a* are made directly on the covering element 52.

The dosing unit 2 of the invention is set up for cleaning and sterilizing (CIP/SIP) operations. These operations, which do not require any component of the dosing unit 2 to be dismantled, include a sequence of steps that can be performed automatically or semiautomatically, during which the inside of the unit is traversed by cleaning liquids at different temperatures and by pressurized steam.

For this purpose, the covering element 52 extends below the tubular element 51 in such a manner that a lower cylindrical portion 52*c* thereof forms the further cavity 53 that acts as a cleaning and sterilizing chamber in a CIP/SIP operating step of the dosing unit 2. The further cavity 53 has a substantially cylindrical shape and has a diameter that is greater than that of the lower dosing chamber 4*a*. The further cavity 53 is flowingly connected to an external drainage circuit of the cleaning and sterilizing fluids via a further outlet 54, including a cleaning conduit, provided with a corresponding connection 54*a* for quick-fit connections.

The piston 3 includes an elongated cylindrical body that includes an intermediate portion 8 between the first end portion 6 and the second end portion 7, the portions being coaxial with one another and coaxial with the first longitudinal axis W1 and having different diameters and lengths.

The intermediate portion 8 is arranged for sealingly sliding inside the lower dosing chamber 4*a*, whereas the second end portion 7 is arranged for sealingly sliding in the upper dosing chamber 4*b*.

The first end portion 6 slides with clearance inside the further chamber 53.

Figure 13:
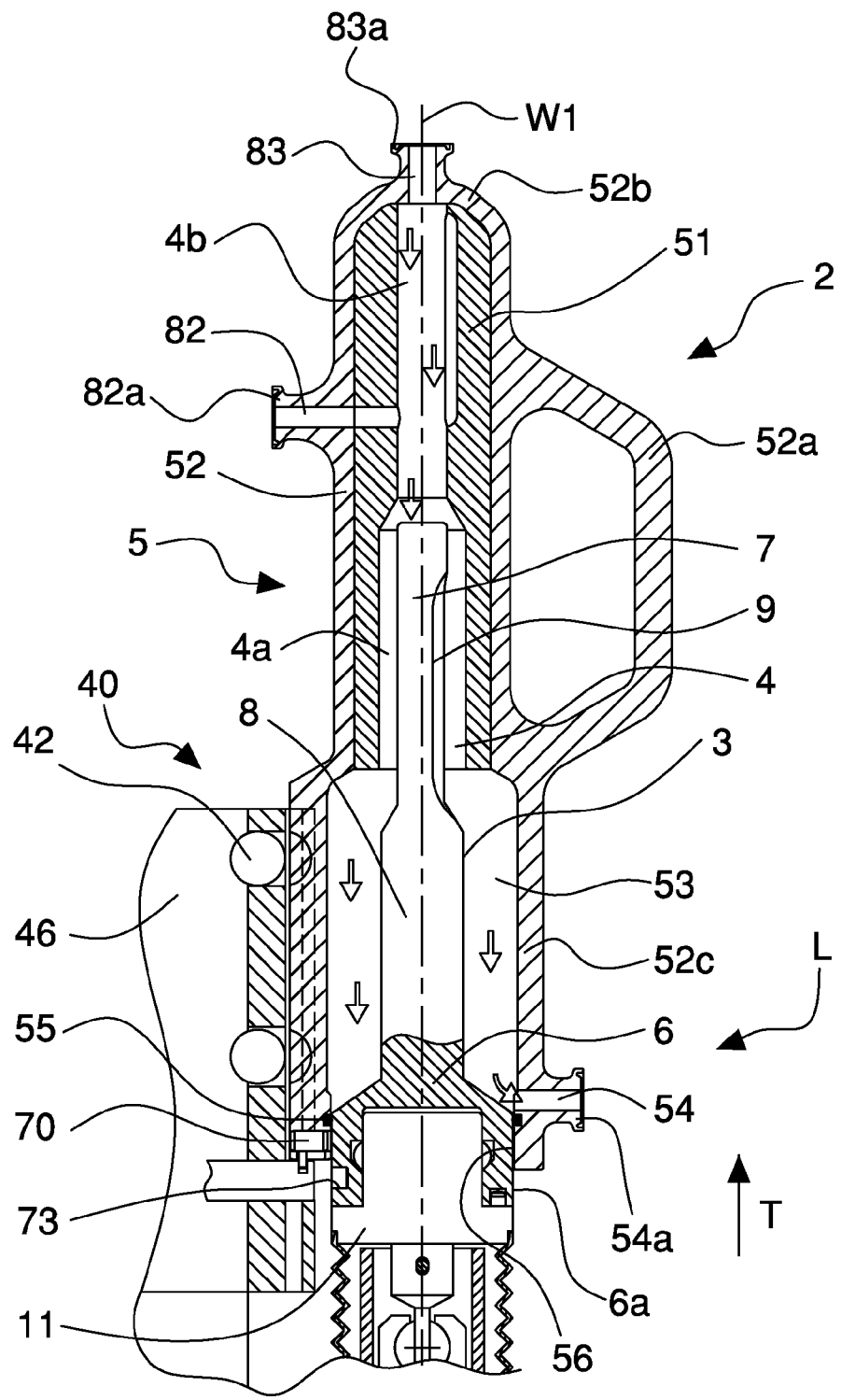
FIG. 13 is a longitudinal section of a dosing unit of the apparatus in FIG. 1 in a cleaning and sterilizing configuration.

In a cleaning and sterilizing configuration L, the piston 3 is arranged to flowingly connect the cavity 4 with the further cavity 53 and with the further outlet 54. In particular, in the cleaning and sterilizing configuration L, the second end portion 7 and the intermediate portion 8 of the piston 3 are contained completely inside the lower dosing chamber 4*a* and the further cavity 53, whereas the first end portion 6 of the piston 3, partially contained inside the further chamber 53, shuts the opening 56 of the further cavity 53. More precisely, an external side wall 6*a* of the first end portion 6 sealingly abuts on a seal 55, including for example an annular seal of the O-ring type and provided in a respective internal wall of the further cavity 53 in such a manner as to provide a flowing connection between the further cavity 53 and the external environment (FIG. 13). In this manner a cleaning and/or sterilizing fluid delivered inside the cavity 4 through the inlet 82 and/or the outlet 83 can reach and lap with the necessary speed all the points of the dosing chambers 4*a*, 4*b* and of the piston 3 that have come into contact with the product to be dosed.

It should be noted that owing to the structure and the embodiment of the dosing unit 2 of the invention, in the interface or coupling zones between the covering element 52 and the internal tubular element 51 the presence of slits, interstices or the like is excluded in which the product to be dosed, or the cleaning and sterilizing fluids may become deposited, making the CIP/SIP operations ineffective or at least unacceptable.

The covering element 52 that is made of synthetic plastics therefore not only covers and protects the ceramic internal tubular element 51 from blows and shocks, but also enables the dosing unit 2 to be fixed to the supporting device 40 and enables the supply and delivery circuits of the product to be dosed and drainage circuits of the cleaning and/or sterilizing fluids to be connected to the dosing unit 2 via the connections 82*a*, 83*a*, 54*a*.

The first end portion 6 of the piston 3 includes a seat 16 configured for removably receiving a clutch portion 11 of the joint 10, the clutch portion 11 being insertable in and disconnectable from the seat 16 along a coupling direction T that is substantially parallel to the first axis W1.

The clutch portion 11 and the seat 16 have a complementary shape, for example a cylindrical shape, and dimensions such as to minimize residual radial clearance.

The joint 10 includes a connecting element 25, which includes the clutch portion 11, and a further connecting element 26 an end portion of which is connected to the movement mechanism 101. The connecting element 25 and the further connecting element 26 are rotatably connected by a spherical element 27.

The further connecting element 26 is moved by the movement mechanism 101 along and around a second axis W2. In use the joint 10 is normally assembled on the movement mechanism 101.

A locking device 12 is provided for reversibly fixing the clutch portion 11 of the first connecting element 25 to the seat 16. The locking device 12 includes one or more stop elements 13, for example two, associated with the clutch portion 11 and movable in such a manner as to engage or disengage respective housings 39 made in the seat 16 respectively to lock or release the first end portion 6 on/from the joint 10. An actuating device 14 acts on the stop elements 13 to push the latter inside the housings 39.

With reference to the embodiment illustrated in the figures, the stop elements 13 have a spherical shape and are inserted into openings 18, made opposite one another on a side wall 19 of the clutch portion 11, from which the stop elements 13 are maintained protruding by the actuating device 14, housed in a space 17 made inside the aforementioned clutch portion 11. The actuating device 14 includes a pressing element 15 that is slidable inside the space 17 and provided with a tilted wall 15a acting on the stop elements 13.

The pressing element 15 defines with a bottom wall of the space 17 a sealed lower chamber 21 to which a pressurized fluid, typically compressed air, is supplied. On the side opposite the lower chamber 21 there is provided an elastic element 22, for example a coil spring, inserted into the aforesaid space 17 and arranged in such a manner as to exert an elastic force that opposes the action exerted by the pressurized fluid.

The housings 39 are formed, for example, by an annular groove made on an internal wall of the seat 16 and shaped in such a manner as to receive the protruding portion of the stop elements 13.

In a coupling configuration B of the joint 10, the stop elements 13 pushed by the pressing element 15, which is in turn pushed by the spring 22, protrude from the openings 18 and engage the housings 39 in such a manner as to firmly lock the clutch portion 11 to the first end portion 6.

In particular, an annular end face 6b of the first end portion 6 abuts on an upper face 20a of an annular crown 20 of the clutch portion 11.

In a release configuration, which is not shown, the pressing element 15 is moved by the pressurized fluid supplied to the lower chamber 21 to a position that is such as to enable the stop elements 13 to return inside the openings 18 so as to disengage the housings 39 and to enable the clutch portion 11 to be disconnected from the first end portion 6.

A transmission is provided for connecting the first end portion 6 to the clutch portion 11 such that the latter can transmit rotation torque.

The transmission includes at least one dowel 23 fixed to the clutch portion 11 and arranged for engaging in a further seat 24 obtained on the first end portion 6.

In particular, the dowel 23 is fixed to the upper face 20a of the annular crown 20 substantially parallel to the first axis W1 in such a manner as to be connected to or disconnected from the further seat 24 when the clutch portion 11 is respectively inserted into or disconnected from the seat 16.

The connecting element 25 includes a fork portion 35 opposite the clutch portion 11, whereas the further connecting element 26 includes a further fork portion 36 opposite the end portion fixed to the movement mechanism 101.

The fork portion 35 and the further fork portion 36 are rotatably connected by the spherical element 27. The fork portions 35, 36 include respective pairs of arms that partially enclose the spherical element 27, the pairs of arms being arranged on respective planes that are substantially orthogonal to one another.

The spherical element 27 permits a relative rotation between the two connecting elements 25, 26, simultaneously ensuring the transmission of traction/compression force between the movement mechanism 101 and the piston 3, to ensure the reciprocating motion of the piston 3 along the first axis W1.

The joint 10 further includes a sleeve 38 that surrounds and contains the fork portions 35, 36. The sleeve 38 is connected to the connecting elements 25, 26 by respective pins 29, 30.

In particular, a first pin 29 connects the sleeve 38 to the connecting element 25, whereas a second pin 30 connects the sleeve 38 to the further connecting element 26.

The first pin 29 and the second pin 30 have a cylindrical shape and are arranged substantially parallel to one another and transverse, in particular substantially orthogonal, to the first axis W1.

The first pin 29 is fixed, at respective opposite ends, to the sleeve 38, for example by coupling through interference, whereas it is rotatably housed in a first through opening 31 of the connecting element 25. The first through opening 31 substantially includes a through slot, having a cross section that is shaped in such a manner as to leave the first pin 29 a radial clearance of a set amount only in a direction parallel to the first axis W1.

Similarly, the second pin 30 is fixed, at respective opposite ends to the sleeve 38, for example by coupling through interference, whereas it is rotatably housed in a second through opening 32 of the further connecting element 26. The second through opening 32 has a cross section that is calibrated and substantially equivalent to that of the second pin 30 to enable the latter to rotate only around the respective longitudinal axis with almost zero radial clearance.

The sleeve 38, owing to the pins 29, 30 rotatably connects the two connecting elements 25, 26 i.e. it is able to transmit rotation torque or twisting moment.

The joint 10 further includes a bellows element 33 that connects the clutch portion 11 of the connecting element 25 to an external wall 102a of the base 102 of the filling machine for enclosing and separating at least the fork portions 35, 36, the spherical element 27, the sleeve 38 and the pins 29, 30 from an external processing environment 80 in which dosing of the product occurs.

The joint 10 thus constitutes a constant-velocity joint that is able to transmit movement torque and an axial force with great precision between the movement mechanism 101 and the piston 3 even if the latter are not aligned.

As illustrated in FIGS. 6 and 7, the connecting elements 25, 26 rotatably connected by the spherical element 27, and the first pin 29 that is slidable in the first through seat 31 enable the joint 10 to operate even if the first axis W1 of the piston 3 is misaligned and/or tilted in relation to the second axis W2 of the further connecting element 26 due, for example, to mounting and/or manufacturing imprecisions of the dosing unit 2 and/or of the supporting device 40.

In a mounting step, after an operator has fixed the dosing unit 2 to the supporting device 40 in the mounting configuration A, the movement mechanism 101 is activated in such a manner as to move the joint 10, that is mounted thereupon, along the second axis W2 until the clutch portion 11 is inserted inside the seat 16 of the first end portion 6.

By activating the locking device 12 in the coupling configuration B it is thus possible to lock the clutch portion 11 firmly on the first end portion 6, i.e. connect the piston 3 to movement mechanism 101.

By performing the opposite operation, i.e. first deactivating the locking device 12, to disengage the stop elements 13 from the housings 39 of the seat 16, and by subsequently activating the movement mechanism 101, it is possible to disengage the clutch portion 11 from the seat 6, decoupling the piston 3 from the joint 10 and thus from the movement mechanism 101.

It should be noted that by virtue of the configuration of the joint 10 and of the piston 3 of the dosing apparatus 1 of the invention—which enables the clutch portion 11 to be inserted into and disconnected from the seat 16 of the first end portion 6 along a coupling direction T that is almost parallel to the first axis W1—it is possible to connect or disconnect the piston 3 to/from the movement mechanism 101 without any need for the first end portion 6 to be positioned outside the casing 5. In particular, the first end portion 6 is always contained, in any operating position thereof, inside the further cavity 53 of the casing 5.

This enables the piston 3 to be reduced and a dosing unit 2 to be made that has compact longitudinal dimensions and is thus particularly suitable for use in filling machines that require a wide accessibility to the processing zone.

The piston 3 is further connectable to or disconnectable from the movement mechanism 101 via the joint 10, in a completely automatic manner, without requiring the manual intervention of an operator and thus reduces downtime and the risk of mounting errors.

FIGS. 8 to 11 illustrate a version of the dosing apparatus 1 that differs from the previously disclosed embodiment for the joint 110 that connects a first end portion 106 of piston 103 to the movement mechanism 101.

The joint 110 includes a connecting element 125 with an elongated shape and provided at an end with a clutch portion 111 arranged for engaging a seat 116 obtained in the first end portion 106. The remaining end of the connecting element 125 is on the other hand connected to the movement mechanism 101, such as to be linearly movable along and rotatable around a second longitudinal axis W2.

Also in this case, the clutch portion 111 is connectable to and detachable from the seat 116 along the coupling direction T that is substantially parallel to the first axis W1 or tilted by a few degrees in relation to the first axis W1, as explained in greater detail below.

The clutch portion 111 and the seat 116 have a complementary shape, for example a frustoconical shape.

The joint 110 includes a locking device 112 arranged for reversibly locking the clutch portion 111 in the seat 116.

The locking device 112 includes a seal 113 fixed to an end of the clutch portion 111 and abutting an internal wall of the seat 116. The seal 113 includes, for example, a ring seal made of elastomeric material housed in an annular cavity 132 formed in the end of the clutch portion 111. The end of the clutch portion 111, the seat 116 and seal 113 define an upper chamber 121 of the locking device 112 that is connected via a conduit 122, to a vacuum source, for example a vacuum circuit. In a coupling configuration B, the negative pressure or vacuum that is created in the upper chamber 121 allows the clutch portion 111 to firmly engage the seat 116 with a connecting force the size of which depends on the shape and dimensions of the upper chamber 121 and on the vacuum values therein.

When the upper chamber 121 is returned to atmospheric pressure, for example by interrupting the connection with the vacuum circuit, the clutch portion 111 can be easily and smoothly disconnected from the seat 116 to enable the piston 103 to be disengaged from the movement mechanism 101.

An abutment is provided for defining a reciprocal axial position along the first axis W1 between the first end portion 106 of the piston 103 and the clutch portion 111 of the connecting element 125, in the coupling configuration B.

The abutment includes a first abutting pin 114 fixed to a bottom wall 116a of the seat 116 and a second abutting pin 115 fixed to the clutch portion 111. An intermediate element 126 that has a spherical shape and is elastically connected to the clutch portion 111 is interposed between the two abutting pins 114, 115.

In the coupling configuration B, the abutting pins 114, 115 contact the intermediate element 126 on opposite sides with a connecting force made by the upper chamber 121 placed under negative pressure. It should thus be noted that in the coupling configuration B there is zero axial clearance between the piston 103 and the connecting element 125.

The intermediate element 126 also acts as a shutter to close the connection between the upper chamber 121 or external environment and conduit 122, when the clutch portion 111 is decoupled from the seat 106.

For this purpose, the clutch portion 111 includes a further space 117 on the bottom of which is fixed the second abutting pin 115 and inside which is inserted the intermediate element 126. A further elastic element 118, for example a coil spring, envelops the second abutting pin 115 and acts on the intermediate element 126 so as to push the intermediate element 126 outside the further space 117. In a release configuration in which the clutch portion 111 is disengaged from the seat 106, the further spring 118 pushes the intermediate element 126 to abut against an annular ridge 119 and against an adjacent further seal 139, provided on a mouth portion of the further space 117. In this position the abutting element 126 seals the further space 117, connected via the conduit 122 to the vacuum source.

A transmission is provided for connecting the first end portion 106 to the clutch portion 111 such that the latter can transmit rotation torque.

The transmission includes one or more dowels 123, for example two, spaced apart, for example by 180°, to a side wall 131 of the coupling element 111 and arranged for engaging in corresponding further seats 124 obtained on the first end portion 106.

The dimensions of the dowels 123 and of the further seats 124 are such as to minimize radial clearance between the piston 103 and the connecting element 125, to ensure the 3 the necessary precision and accuracy in rotation motion during operation of the piston 3.

The dowels 123 are fixed substantially perpendicularly to a longitudinal axis of the connecting element 125 in such a manner as to be inserted into or disconnected from the, further seats 124 when the clutch portion 111 is inserted into or disconnected from the seat 106. The further seats 124 include respective slots that are open below.

The joint 110 includes a bellows element 133 that connects the clutch portion 11 of the connecting element 125 to an external wall 102a of the base 102 of the filling machine for closing an opening for the passage of the connecting element 125 made in the external wall 102a by the processing environment 80.

In the coupling configuration B of the joint 110, the seal 113 is crushed between the clutch portion 111 and the internal wall of the seat 116 by the connecting force generated by the vacuum in the upper chamber 121. Owing to the elasticity and malleability of the seal 113, the latter not only ensures the insulation of the upper chamber 121 from the external environment, but is able to transmit rotation torque or twisting moment between the connecting element 125 and the first end portion 106 of the piston 103 during normal operation of the dosing unit.

If the seal 113 slides in relation to the internal wall of the seat 116 or in relation to the annular cavity 132 of the clutch portion 111, the transmission, in particular the dowels 123 and the further seats 124, ensure correct angular positioning between the piston 103 and the connecting element 125 and correct transmission of the rotation torque.

As illustrated in FIGS. 10 and 11, owing to the elasticity and malleability of the seal 113, to the frustoconical shape of the clutch portion 111 and of the seat 106 and to the radial clearance between the clutch portion 111 and the seat 106, the joint 111 is able to precisely and accurately transmit to the piston 103 a linear and rotation movement, even if the first axis W1 and the second axis W2 are misaligned and/or tilted in relation to one another.

The joint 110 constitutes a constant-velocity joint that is able to transmit rotational torque with great precision and an axial force between the movement mechanism 101 and the piston 103 especially in the case of imprecise mounting or manufacturing of the dosing unit 2 and/or of the supporting device 40.

Also in this version of the dosing apparatus 1 it is possible to selectively connect or disconnect the piston 3 to/from the movement mechanism 101 automatically without the manual intervention of an operator, with the first end portion 106 always arranged inside the casing 5 in any operating position.

With particular reference to FIGS. 1 to 3 and 12, the dosing apparatus 1 includes a coupling device 60 associated with the casing 5 and arranged for slidably engaging in a guide 41 of the supporting device 40 in the mounting configuration A of the dosing unit 2. The coupling device 60 is insertable into or disconnectable from the guide 41 along a first direction X, substantially parallel to the first longitudinal axis W1. The first direction X is, for example, vertical and substantially orthogonal to the upper wall 102a of the base 102 of the filling machine to which the supporting device 40 can be fixed.

In one version of the apparatus 1 that is not shown, the first direction X may be, for example, horizontal and substantially orthogonal to the first axis W1.

The supporting device 40 includes a supporting body 46 fixed to the upper wall 102a and supporting the guide 41. The latter includes a guiding element that has a flat shape and is provided with a rectilinear groove 49 that has a T-shaped cross section and extends parallel to the first direction X.

The coupling arrangement 60 includes a T-shaped coupling element fixed to the casing 5 in such a manner as to slidably engage in the rectilinear groove 49 with a preset clearance to enable the dosing unit 2 to be easily mounted on and dismantled from the supporting device 40.

The coupling element 60 is, for example, provided directly on a side wall of the lower cylindrical portion 52c of the covering element 52.

Alternatively, the coupling element 60 can be a distinct element and fixed to the aforesaid side wall of the lower cylindrical portion 52c.

The supporting device 40 further includes a fixture arranged for reversibly locking the coupling element 60 to the guiding guide 41. The fixing fixture includes at least two fixing elements 42, 43 associated with the guiding guide 41 and movable in such a manner as to engage with or disengage from respective coupling notches 62, 63 of the coupling element 60, respectively, to lock or release the coupling device 60 to or from the guiding guide 41.

A pushing device is provided for acting on the fixing elements 42, 43 and pushing the latter to abut against the coupling notches 62, 63 with a preset fixing force along a second direction Y, which is substantially orthogonal to the first direction X.

With reference to the embodiment illustrated in the figures, the fixture includes a first fixing element 42 and a second fixing element 43 that have a spherical shape and are inserted respectively into a first opening 47 and into a second opening 48 aligned on and superimposed on the first direction X in the guide 41. The first fixing element 42 and the second fixing element 43 are maintained in a protruding position by the pushing device such as to engage, respectively, a first coupling notch 62 and a second coupling notch 63 of the coupling element 60, in the mounting configuration A.

The pushing device includes an actuating device, in particular a first actuator 44 and a second actuator 45, for example of pneumatic or mechanical type, connected to the first fixing element 42 and to the second fixing element 43, respectively. By activating the actuators 44, 45, it is possible to move the fixing elements 42, 43 alternatively to a retracted position or to a protruding position, in which the fixing force is applied by the fixing elements 42, 43 to the coupling notches 62, 63. In an alternative embodiment that is not shown, the actuators 44, 45 can be replaced by an elastic device that is suitable for coupling with the fixing elements 42, 43.

The first opening 47 and the second opening 48 are provided with stopping portions that are not illustrated in the figures, to prevent the fixing elements 42, 43 from completely exiting from the openings 47, 48, i.e. to enable the fixing elements 42, 43 to protrude by a preset amount.

The coupling notches 62, 63 have a spherical cap shape with a curvature radius that is less than the curvature radius of the fixing elements 42, 43 such that the coupling notches 62, 63 abut on the fixing elements 42, 43 along respective substantially annular contact surfaces 65, 66.

The first opening 47 includes a cylindrical hole having a diameter that is such as to house the first fixing element 42 with a reduced radial clearance.

When the first fixing element 42 abuts on the first coupling notch 62 and pushes the coupling element 60 against the rectilinear groove 49 along the second direction Y, the dosing unit 2 is locked in a firm and precise manner, prevented from moving in the first direction X, in the second direction Y and in a third direction Z that is orthogonal to the first direction X and to the second direction Y.

The second opening 48 includes, on the other hand, a through slot that is elongated in the first direction X to enable the second fixing element 43 to adapt to the position of the second coupling notch 63 and compensate for variations in distance between the latter and the first coupling notch 62 along the first direction X.

When the second fixing element 43 abuts on the second coupling notch 63 and pushes the coupling element 60 against the rectilinear groove 49, the dosing unit 2 is also locked in rotation around an axis that is parallel to the direction Y and passes at the first fixing element 42.

The first coupling notch 62 and the second coupling notch 63 are made in corresponding inserts 67, 68 made of metallic material and incorporated in the coupling element 60 to ensure greater stiffness and nondeformation to the aforesaid coupling notches 62, 63 and greater precision and resistance in the abutment on the fixing elements 42, 43.

The dosing unit 2 also includes a stop arranged for preventing or enabling the piston 3 to slide inside the cavity 4 of the casing 5 along the first axis W1. In particular, the stop locks the piston 3 in relation to the casing 5 in a preset linear and angular position, in such a manner as to maintain the dosing unit 2 in an assembled condition R that is necessary for conveying and mounting/dismantling from the joint 10.

The stop includes, in particular, a stop pin 70 that is slidably mounted in a first housing or recess 71, made on a side wall of the lower cylindrical portion 52c of the covering element 52, and arranged for engaging a second housing or recess 73, obtained on an external wall 6a of the first end portion 6, at the opening of the seat 16.

The second housing 73 includes a hole having dimensions that are substantially equivalent to those of the stop pin 70.

The stop pin 70 is movable parallel to the second direction Y, i.e., perpendicular to the first longitudinal axis W1 and is moved by a driving device of the supporting device 40 between a retracted position and an extended position. In the refracted position the stop pin 70 is completely contained in the first housing 71 in such a manner as to not interact with the first end portion 6 and enable the piston 3 to move. In the extended position the stop pin 70 is inserted into the second housing 73 and prevents the piston 3 from moving along and rotating around the first longitudinal axis W1 determining the assembled condition R of the dosing unit 2.

A driving pin 75, fixed transversely to the stop pin 70, is engaged by a driving stem 74 of the driving device. The driving stem 74 is parallel to the stop pin 70 and is driven by a linear actuating device 76, including for example a pneumatic cylinder of the driving device. The driving stem 74 has a respective radial groove that is suitable for receiving the driving pin 75.

In a mounting step of the dosing unit 2 to the supporting device 40, the operator supports the dosing unit 2 arranged in the assembled condition R by means of the gripping portion 52a and inserts the coupling element 60 inside the guide 41 along the first direction X. The clearance between the coupling element 60 and the rectilinear groove 49 of the guide 41 permits easy and rapid insertion.

With the fixing elements 42, 43 maintained in the retracted position by the respective actuators 44, 45 inside the respective openings 47, 48, the coupling element 60 slides inside the guide 41 until it reaches a final position in which the aforementioned fixing elements 42, 43, pushed by the respective actuators 44, 45 in the protruding position, abut the respective coupling notches 62, 63, locking in position the dosing unit 2 in the mounting configuration A.

By performing the operation in reverse order, i.e., by removing the coupling element 60 from the guiding guide 41, with the fixing elements 42, 43 maintained in the retracted position by the respective actuators 44, 45 it is possible to dismantle the dosing unit 2 from the supporting device 40.

Once the dosing unit 2 is inserted in the supporting device 40, the stop pin 70 still maintains the piston 3 fixed to the casing 5, locked in the assembled condition R in a preset linear and angular position to enable the movement mechanism 101 to move the joint 10 along the second longitudinal axis W2 until the clutch portion 11 is inserted inside the seat 16 of the first end portion 6. Once the locking device 12 has been driven to mutually fix the clutch portion 11 to the seat 16, the stop pin 70 is disengaged from the piston 3. In particular, the linear actuating device 76 is activated for moving the stop pin 70 in the retracted position so as to enable the piston 3 to move freely.

In a version of the apparatus that is not illustrated in the figures, the stop pin 70 engages a third housing made in the guiding guide 41 to prevent the coupling element 60 from sliding, i.e., the dosing unit 2 from being extracted from the supporting device 40.

Owing to the dosing apparatus 1 of the invention it is thus possible to hook and lock the dosing unit to the respective supporting device 40 in a rapid, easy and simultaneously precise and firm manner.

It is important to note that the mounting procedure can be performed by only one operator and is made particularly easy by the shape and the dimensions of the guide 41 and the clearance of the coupling device 60. The fixing elements driven by the respective actuators 44, 45 further enable the dosing unit 2 to be locked automatically when the latter has reached the desired position.

The entire mounting operation is made even easier by virtue of the stop, and in particular by the stop pin 70 that, in the assembled condition R, fixes the piston 3 to the casing 5. In this manner, the operator can support the dosing unit 2 by the gripping portion 52a and insert the coupling element 60 inside the guide 41 along the first direction X without worrying about also supporting the piston 3, as usually occurs in known dosing syringes.

It should also be noted that the disengagement of the stop pin 70 from the piston 3 to enable the movement of the piston 3 in the cavity 4 occurs automatically by the driving device, in particular the driving stem 74 and the linear actuating device 76.

The procedure for dismantling the dosing unit 2 from the supporting device 40 is similarly easy and rapid and occurs by manually removing the coupling device 60 from the guide 41 along the first direction X.

It should be noted that the dosing unit 2 can be mounted on the supporting device 40 after being subjected to separate cleaning and sterilizing procedures. In this case, the external casing 5 made of synthetic plastics, which completely contains the internal tubular element 51, the piston 3, the cavity 4 and the further cavity 53, in addition to protecting the aforementioned internal components from blows and impacts, substantially isolates the internal components from the external environment, ensuring the sterility thereof.

In the assembled condition R, the insulation of the internal part of the dosing unit 2 is in fact ensured inferiorly by the seal 55 that is fixed to the internal wall of the further cavity 53 and is sealed by the external side wall 6a of the first end portion 6 to prevent the flow connection with the external environment. The seal 55 defines, in other words, the lower sterility line of the dosing unit 2. Insulation is also ensured by a cover of known type and that is not illustrated in the figures such as, for example, paper or caps, that hermetically closes the inlet 82 and the outlet 83 of the cavity 4 and the further outlet 54 of the further cavity 53.

The dosing unit 2 of the invention in the assembled condition R may thus be manipulated, transported and mounted on the supporting device 40 without the risk of contaminating the internal parts (piston 3, cavity 4 and further cavity 53) that, having been cleaned and sterilized, are intended to come into contact with the product during production.

The invention claimed is:
1. A dosing unit, comprising
(a) a housing including an inner tubular member containing a first cavity and an outer cover enveloping said inner tubular member and containing a second cavity communicating with said first cavity, said housing containing an inlet and a first outlet for a dose of a product and a second outlet for at least one of cleaning and sterilizing fluids;
(b) a piston arranged within said first and second cavities for movement along a first axis to open and close said inlet and first and second outlet openings.

2. A dosing unit according to claim 1, wherein said inner tubular member is made of ceramic material.

3. A dosing unit according to claim 1, wherein said outer cover is made of synthetic plastics and is molded around said inner tubular member to form a single body.

4. A dosing unit according to claim 1, wherein said second cavity contains an opening for receiving said piston.

5. A dosing unit according to claim 1, wherein said piston contains a recess to selectively connect said first cavity with said inlet or with said first outlet.

6. A dosing unit according to claim 1, wherein said first cavity is a through cavity which extends longitudinally for the entire length of said inner tubular member, said first cavity including a bottom dosing chamber and a top dosing chamber above said bottom dosing chamber.

7. A dosing unit according to claim 6, wherein said dosing chambers are substantially cylindrical, said bottom dosing chamber having a diameter larger than the diameter of said top dosing chamber.

8. A dosing unit according to claim 7, wherein said second cavity is substantially cylindrical and has a diameter larger than the diameter of said bottom dosing chamber.

9. A dosing unit according to claim 6, wherein said inlet and said first outlet are connected with said top dosing chamber.

10. A dosing unit according to claim 6, wherein said piston includes a first end portion, an intermediate portion and a second end portion, substantially coaxial with each other, said intermediate portion and said second end portion being arranged for sealing and sliding within said bottom dosing chamber and said top dosing chamber, respectively, said first end portion sliding in said second cavity and being configured to connect with a drive mechanism of said piston.

11. A dosing unit according to claim 1, wherein said inlet is transverse to said first axis and comprises a respective conduit arranged within side walls of said tubular member and of said cover.

12. A dosing unit according to claim 1, wherein said first outlet comprises a conduit arranged within a top portion of said cover, said top portion being configured to close said first cavity.

13. A dosing unit according to claim 1, and further comprising a seal fixed to an internal wall of said second cavity for abutting against a first end portion of said piston when said piston is displaced from said first cavity in a cleaning and sterilizing configuration to connect said first an second cavities and to prevent a connection between said first and second cavities and an external environment.

14. A dosing unit according to claim 1, wherein said includes a handle-shaped gripping portion for allowing an easy gripping and handling of said dosing unit by an operator.

15. A dosing unit according to claim 1, and further comprising a stop assembly for reversibly locking said piston with said housing in an assembled condition in which said piston is fixed in a preset linear and angular position with respect to housing.

16. A dosing unit according to claim 15, wherein said stop assembly comprises a stop pin arranged in a first recess of said housing and arranged for engaging a second recess in a first end portion of said piston.

* * * * *